United States Patent
El Defrawy et al.

(10) Patent No.: US 10,243,811 B1
(45) Date of Patent: Mar. 26, 2019

(54) LATTICE-BASED INFERENCE OF NETWORK SERVICES AND THEIR DEPENDENCIES FROM HEADER AND FLOW DATA

(71) Applicant: HRL Laboratories, LLC, Malibu, CA (US)

(72) Inventors: Karim El Defrawy, Santa Monica, CA (US); Michael J. O'Brien, Culver City, CA (US); James Benvenuto, Beverly Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 240 days.

(21) Appl. No.: 15/410,755

(22) Filed: Jan. 19, 2017

Related U.S. Application Data

(60) Provisional application No. 62/286,306, filed on Jan. 22, 2016.

(51) Int. Cl.
  *G06F 15/173* (2006.01)
  *H04L 12/24* (2006.01)
  *H04L 29/06* (2006.01)

(52) U.S. Cl.
  CPC .......... *H04L 41/5058* (2013.01); *H04L 69/22* (2013.01)

(58) Field of Classification Search
  USPC ....... 709/203, 206, 217, 219, 223, 224, 226, 709/228, 230, 232, 238; 707/737, 749
  See application file for complete search history.

(56) References Cited

U.S. PATENT DOCUMENTS

| | | | |
|---|---|---|---|
| 2005/0108252 A1* | 5/2005 | Pfaltz ................ | G06F 17/30539 |
| 2006/0112108 A1* | 5/2006 | Eklund ............... | G06F 17/3071 |
| 2013/0238622 A1* | 9/2013 | Tang ................. | G06F 17/30864 707/737 |
| 2014/0032736 A1* | 1/2014 | Mounaouar .......... | H04L 43/026 709/224 |
| 2014/0122507 A1* | 5/2014 | Zeng ................ | G06F 17/30867 707/749 |
| 2016/0205003 A1* | 7/2016 | Srinivasan ............. | H04L 67/10 709/224 |

OTHER PUBLICATIONS

Natarajan, Arun, et al. NSDMiner: Automated Discovery of Network Service Dependencies. IEEE, 2012, pp. 2507-2515.

(Continued)

*Primary Examiner* — Quang N Nguyen
(74) *Attorney, Agent, or Firm* — Tope-McKay & Associates

(57) ABSTRACT

Described is system for automatically detecting network services and their dependencies. The system generates a first context table having rows of packet headers and columns of header field values. A first concept lattice is generated from the first context table, and network services and corresponding packet headers are identified. A second context table is generated using the networks services data, and a second concept lattice is generated from the second context table. Network service dependencies are identified using the second concept lattice. The context tables are used to monitor the plurality of network service dependencies.

6 Claims, 9 Drawing Sheets

| Header Number | Time Stamp | Version | Type of Service (ToS) | SRC_IP | SRC_PORT | DST_IP | DST_PORT | PROTOCOL | FLAGS |
|---|---|---|---|---|---|---|---|---|---|
| #1 | Time 1 | IPv4 | 3 | A.A.A.A | 2000 | W.W.W.W | 80 (HTTP) | TCP | SYN |
| #2 | Time2 | IPv 4 | 4 | B.B.B.B | 3000 | S.M.T.P | 25(SMTP) | TCP | ACK |
| #3 | Time3 | IPv 6 | 3 | C.C.C.C | 4000 | F.T.P.P | 21(FTP) | TCP | SYN |
| #4 | Time4 | IPv4 | 3 | D.D.D.D | 3500 | W.W.W.W | 80(HTTP) | TCP | FIN |

(56) References Cited

OTHER PUBLICATIONS

Chen, Xu, et al. "Automating Network Application Dependency Discovery: Experiences, Limitations, and New Solutions." OSDI. vol. 8. 2008, pp. 117-130.

Kandula, Srikanth, Ranveer Chandra, and Dina Katabi. "What's going on?: learning communication rules in edge networks" ACM SIGCOMM Computer Communication Review 38.4, 2008, pp. 87-98.

Bahl, Paramvir, et al. "Towards highly reliable enterprise network services via inference of multi-level dependencies." ACM SIGCOMM Computer Communication Review. vol. 37. No. 4. ACM, 2007, pp. 13-24.

Popa, Lucian, et al. "Macroscope: end-point approach to networked application dependency discovery." Proceedings of the 5th international conference on Emerging networking experiments and technologies. ACM, 2009, pp. 229-240.

Fonseca, Rodrigo, et al. "X-trace: A pervasive network tracing framework." Proceedings of the 4th USENIX conference on Networked systems design & implementation. USENIX Association, 2007, pp. 271-284.

Barham, Paul, et al. "Constellation: automated discovery of service and host dependencies in networked systems." TechReport, MSR-TR-2008-67, 2008, pp. 1-14.

Brown, Aaron, Gautam Kar, and Alexander Keller. "An active approach to characterizing dynamic dependencies for problem determination in a distributed environment." Integrated Network Management Proceedings, 2001 IEEE/IFIP International Symposium on. IEEE, 2001, pp. 377-390.

Marshall, Scott. "CANDID: Classifying Assets in Networks by Determining Importance and Dependencies," 2013, pp. 1-83.

Ganter, B. & Wille, R. 1998. Formal Concept Analysis: Mathematical Foundations. Springer-Verlag, Chapter 1.

Carpineto, C. & Romano, G. 2004. Concept Data Analysis: Theory and Applications. Wiley, Chapter 2.

Ganter, B. & Wille, R. 1989. Conceptual Scaling. In: F. Roberts (ed.) Applications of combinatorics and graph theory to the biological and social sciences, pp. 139-167. Springer, New York.

Wolff, K.E. States, Transitions, and Life Tracks in Temporal Concept Analysis. Lecture Notes in Computer Science. V 3626, pp. 127-148, 2005.

Wolff, K.E. (2001) Temporal Concept Analysis. In: E. Mephu Nguilo et al (eds.): ICCS2001 International Workshop on Concept Lattice-Based Theory, Methods and Tools for Knowledge Discovery in Databases, Stanford University, Palo Alto, pp. 91-107.

Wolff, K.E. Concepts, States, and System& In: Dubois, D.M. (eds): Computing Anticipatory Systems. CASYS'99—Third international Conference, Liege, Belgium, 1999, American Institute of Physics Conference Proceedings 517, 2000, pp. 83-97.

Kuznetsov S., Obiedkov S. Comparing Performance of Algorithms for Generating Concept Lattices, 14, Journal of Experimental and Theoretical Artificial Intelligence, Taylor & Francis, pp. 189-216, 2002.

Stumme G., Taouil R., Bastide Y., Pasquier N., Lakhal L. Fast Computation of Concept Lattices Using Data Mining Techniques. Proc. 7th Int. Workshop on Knowledge Representation Meets Databases (KRDB 2000), pp. 129-139, 2000.

van der Merwe D, Obiedkov S., Kourie D. AddIntent: A New Incremental Algorithm for Constructing Concept Lattices, In: Proceedings of the 2nd International Conference on Formal Concept Analysis (ICFCA 2004). "Concept Lattices, Proceedings", Lecture Notes in Artificial Intelligence, vol. 2961, pp. 372-385, 2004.

Chen, Xu, et al. "Automating Network Application Dependency Discovery: Experiences, Limitations, and New Solutions." OSDI. vol. 8. 2008, pp. 1-14.

Marshall, Scott. "CANDID: Classifying Assets in Networks by Determining Importance and Dependencies." (2013), pp. 0-83.

Natarajan, Arun, et al. NSDMiner: Automated Discovery of Network Service Dependencies. IEEE, INFOCOM, 2012, pp. 2507-2515.

Peddycord III, Barry et al. "On the Accurate Identification of Network Service Dependencies in Distributed Systems." USENIX Association 26th Large Installation System Administration Conference (LISA '12), pp. 181-194, 2012.

Kelly, et al., "CANDID: Comparison Algorithm for Navigating Digital Image Databases," Computer Research and Applications Group, CIC-3, Los Alamos National Laboratory, Los Alamos, NM, 87545, 1994, pp. 252-258.

* cited by examiner

|  | Size small (ss) | Size medium (sm) | Size large (sl) | Distance near (dn) | Distance far (df) | Moon (my) | No moon (nm) |
|---|---|---|---|---|---|---|---|
| Mercury | X |  |  | X |  |  | X |
| Venus | X |  |  | X |  |  | X |
| Earth | X |  |  | X |  | X |  |
| Mars | X |  |  | X |  | X |  |
| Jupiter |  |  | X |  | X | X |  |
| Saturn |  |  | X |  | X | X |  |
| Uranus |  | X |  |  | X | X |  |
| Neptune |  | X |  |  | X | X |  |
| Pluto | X |  |  |  | X | X |  |

FIG. 5A

| Header Number | Time Stamp | Version | Type of Service (ToS) | SRC_IP | SRC_PORT | DST_IP | DST_PORT | PROTOCOL | FLAGS |
|---|---|---|---|---|---|---|---|---|---|
| #1 | Time1 | IPv4 | 3 | A.A.A.A | 2000 | W.W.W.W | 80 (HTTP) | TCP | SYN |
| #2 | Time2 | IPv4 | 4 | B.B.B.B | 3000 | S.M.T.P | 25 (SMTP) | TCP | ACK |
| #3 | Time3 | IPv6 | 3 | C.C.C.C | 4000 | F.T.P.P | 21 (FTP) | TCP | SYN |
| #4 | Time4 | IPv4 | 3 | D.D.D.D | 3500 | W.W.W.W | 80 (HTTP) | TCP | FIN |

FIG. 6

| | Time Stamp | | | | Version | | ToS | | SRC_IP | | | |
|---|---|---|---|---|---|---|---|---|---|---|---|---|
| | T1 | T2 | T3 | T4 | IPv4 | IPv6 | 3 | 4 | A.A.A.A | B.B.B.B | C.C.C.C | D.D.D.D |
| #1 | X | | | | X | | X | | X | | | |
| #2 | | X | | | X | | | X | | X | | |
| #3 | | | X | | | X | X | | | | X | |
| #4 | | | | X | X | | X | | | | | X |

| | SRC_PORT | | DST_IP | | | DST_PORT | | | PROTOCOL | | FLAGS | | |
|---|---|---|---|---|---|---|---|---|---|---|---|---|---|
| | ≤1000 | >1000 | W.W.W.W | S.M.T.P. | F.T.P.P. | 80 | 25 | 21 | TCP | Other | SYN | ACK | FIN |
| #1 | | X | X | | | X | | | | | X | | |
| #2 | | X | | X | | | X | | X | | | X | |
| #3 | | X | | | X | | | X | X | | X | | |
| #4 | | X | X | | | X | | | X | | | | X |

FIG. 7

LATTICE-BASED INFERENCE OF NETWORK SERVICES AND THEIR DEPENDENCIES FROM HEADER AND FLOW DATA

CROSS-REFERENCE TO RELATED APPLICATIONS

This is a Non-Provisional Application of U.S. Provisional Application No. 62/286,306, filed in the United States on Jan. 22, 2016, entitled, "Lattice-Based Inference of Network Services and Their Dependencies from Header and Flow Data," the entirety of which is hereby incorporated by reference as though fully set forth herein.

BACKGROUND OF INVENTION

(1) Field of Invention

The present invention relates to a system for automatically detecting network services and their dependencies and, more particularly, to a system for automatically detecting network services and their dependencies using formal concept analysis.

(2) Description of Related Art

A network service is an application running at the network layer (i.e., layer 3 in the Open Systems Interconnection (OSI) networking stack) and the layers above that provide data storage, manipulation, presentation, and communication. Network services (layers 3 and/or 4) often depend on one another to provide and support network-based services and applications. Detecting and understanding network service dependencies is significant to maintaining the proper function of a network and its applications, especially in the presence of network attacks and failures.

There are tools for network service dependency detection, but they all have disadvantages and shortcomings, which are described in the List of Cited Literature References, Literature Reference No. 1. Many of the tools do not use all of the data that is likely available to aid their search and analysis, and most do not fully consider the interactions between more than two services, such as network profiles. Network profiles are collections of properties that determine how the network is configured and how it operates based on current network conditions.

One shortcoming typically found in passive dependency inference (i.e., the inference mechanism, algorithm, or method does not require sending additional traffic or data on the network or to hosts; such mechanisms passively monitor traffic and are transparent to other elements in the network) is the presence of "blind spots", which is the traffic in a network that does not pass through anywhere that has packet or flow collection. Examples of algorithms and programs using passive dependency detection methods include NSDMiner (see the List of Incorporated Literature References, Literature Reference No. 1), eXpose (see Literature Reference No. 3), Orion (see Literature Reference No. 2) and many others. NSDMiner (see Literature Reference No. 1) does have a limited form of service profile detection with its similarity and clustering features. However, both of these features are intended for other purposes. The main purpose of the clustering features is to reduce the number of duplicate rules that occur when a service is load balanced or mirrored between multiple IP (internet protocol) addresses, and not to identify groups of services that tightly depend on each other to perform some action. The purpose of the similarity feature is to weight infrequently used services that are similar to a well-used service so that this infrequent service is not pruned, eXpose (see Literature Reference No. 3) uses patterns for its dependency detection. However eXpose is similar to NSDMiner in that it only considers pairs of services, not chains, and it does not attempt to use patterns to infer unobservable dependencies.

Thus, a continuing need exists for a system for automatically detecting network services and establishing dependencies between the detected services.

SUMMARY OF THE INVENTION

Some embodiments of the present invention relate to a system for automatically detecting network services and their dependencies and, more particularly, to a system for automatically detecting network services and their dependencies using formal concept analysis. The system comprises one or more processors and a memory having instructions such that when the instructions are executed, the one or more processors perform multiple operations. The system generates a first context table having a plurality of rows and columns representing objects and attributes, respectively, wherein the objects are packet headers and the attributes are a set of values of header fields. A first concept lattice having a plurality of nodes is generated using the first context table. A set of network services and a set of corresponding packet headers are identified using the first concept lattice. A second context table is generated using the set of corresponding packet headers and a set of attributes related to the set of corresponding packet headers. A second concept lattice having a plurality of nodes is generated using the second context table. A plurality of network service dependencies are identified using the plurality of nodes in the second concept lattice. At least one of the first and second context table are used to monitor the plurality of network service dependencies.

In another aspect, the first concept lattice is used to identify relationships between the packet headers and the set of values of header fields.

In another aspect, the set of network services comprises a tuple of network services, and the set of network services is identified by classifying the plurality of nodes in the first concept lattice.

In another aspect, the second concept lattice indicates relationships between network services and their temporal network service dependencies.

In another aspect, the set of attributes related to the set of corresponding packet headers comprises a temporal relationship.

In another aspect, the present invention also comprises a method for causing a processor to perform the operations described herein and performing the listed operations.

Finally, in yet another aspect, the present invention also comprises a computer program product comprising computer-readable instructions stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 5A is an illustration of a second context table according to some embodiments;

FIG. 6 is a table of headers as objects and header fields and their values according to some embodiments;

FIG. 7 is an object-attribute context table resulting from the header data in the table of FIG. 6 according to some embodiments.

DETAILED DESCRIPTION

Figure 1:
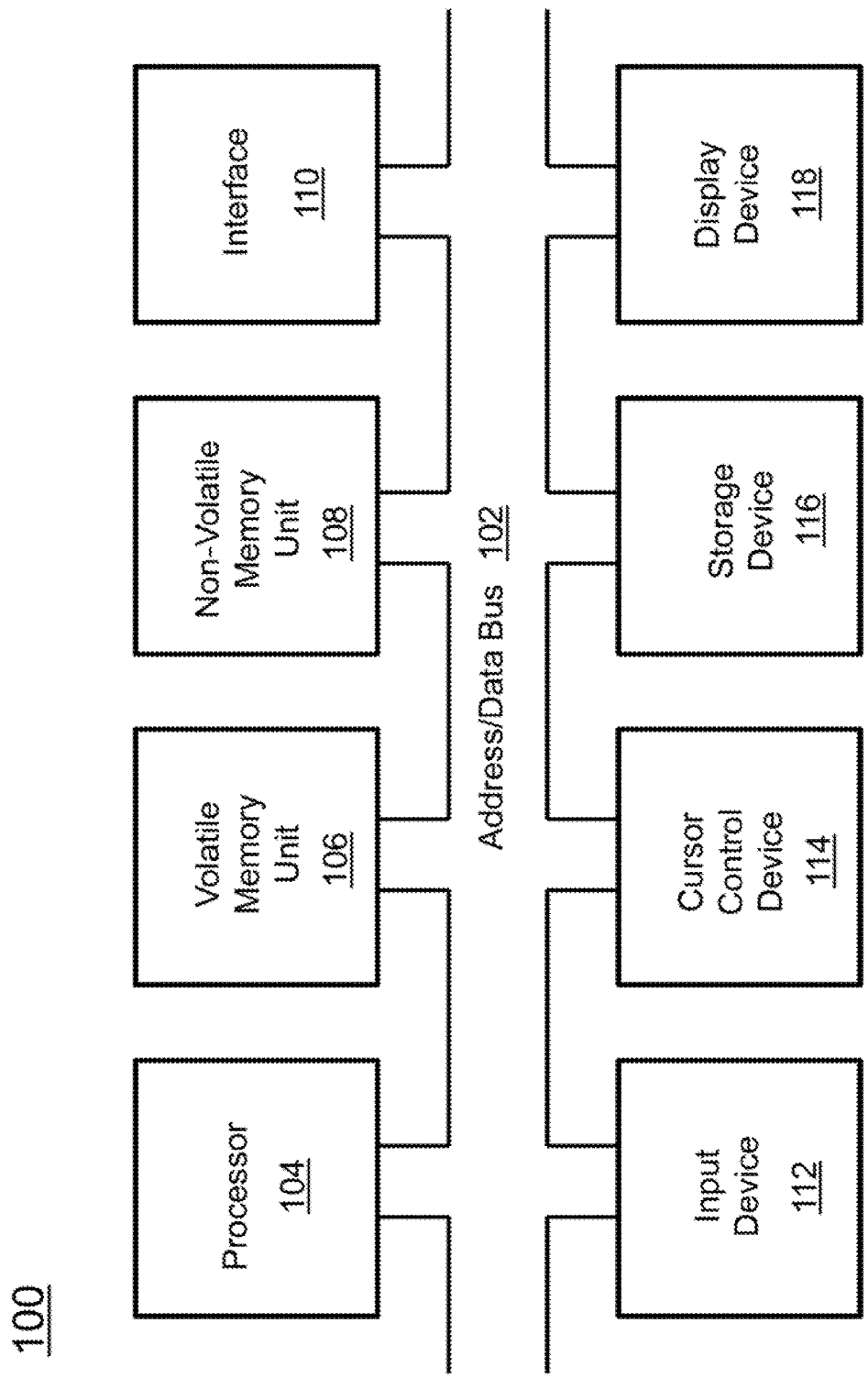
FIG. 1 is a block diagram depicting the components of a system for automatically detecting network services and their dependencies according to some embodiments.

The present invention relates to a system for automatically detecting network services and their dependencies and, more particularly, to a system for automatically detecting network services and their dependencies using formal concept analysis. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

Before describing the invention in detail, first a list of incorporated literature references as used in the description is provided. Next, a description of various principal aspects of the present invention is provided. Following that is an introduction that provides an overview of the present invention. Finally, specific details of the present invention are provided to give an understanding of the specific aspects.

(1) LIST OF INCORPORATED LITERATURE REFERENCES

The following references are incorporated and cited throughout this application. For clarity and convenience, the references are listed herein as a central resource for the reader. The following references are hereby incorporated by reference as though fully included herein. The references are cited in the application by referring to the corresponding literature reference number, as follows:

1. Natarajan, Arun, et al. NSDMiner: Automated Discovery of Network Service Dependencies. IEEE, 2012.
2. Chen, Xu, et al. "Automating Network Application Dependency Discovery: Experiences, Limitations, and New Solutions." OSDI. Vol. 8. 2008.
3. Kandula, Srikanth, Ranveer Chandra, and Dina Katabi. "What's going on?: learning communication rules in edge networks." ACM SIGCOMM Computer Communication Review 38.4, 2008, 87-98.
4. Bahl, Paramvir, et al. "Towards highly reliable enterprise network services via inference of multi-level dependencies." ACM SIGCOMM Computer Communication Review. Vol. 37. No. 4. ACM, 2007.
5. Popa, Lucian, et al. "Macroscope: end-point approach to networked application dependency discovery." Proceedings of the 5th international conference on Emerging networking experiments and technologies. ACM, 2009.
6. Fonseca, Rodrigo, et al. "X-trace: A pervasive network tracing framework." Proceedings of the 4th USENIX conference on Networked systems design & implementation. USENIX Association, 2007.
7. Barham, Paul, et al. "Constellation: automated discovery of service and host dependencies in networked systems." TechReport, MSR-TR-2008-67, 2008.
8. Brown, Aaron, Gautam Kar, and Alexander Keller. "An active approach to characterizing dynamic dependencies fobr problem determination in a distributed environment." Integrated Network Management Proceedings, 2001 IEEE/IFIP International Symposium on. IEEE, 2001.
9. Marshall, Scott. "CANDID: Classifying Assets in Networks by Determining Importance and Dependencies," 2013.
10. Ganter, B. & Wille, R. 1998. Formal Concept Analysis: Mathematical Foundations. Springer-Verlag, Chapter 1.
11. Carpineto, C. & Romano, G. 2004. Concept Data Analysis: Theory and Applications. Wiley, Chapter 2.
12. Ganter, B. & Wille, R. 1989. Conceptual Scaling. In: F. Roberts (ed.) Applications of combinatorics and graph theory to the biological and social sciences, 139-167. Springer, New York.
13. Wolff, K. E. States, Transitions, and Life Tracks in Temporal Concept Analysis. Lecture Notes in Computer Science. V 3626, 127-148, 2005.
14. Wolff, K. E. (2001) Temporal Concept Analysis. In: E. Mephu Nguilo et al (eds.): ICCS2001 International Workshop on Concept Lattice-Based Theory, Methods and Tools for Knowledge Discovery in Databases, Stanford University, Palo Alto, 91-107.
15. Wolff, K. E. Concepts, States, and Systems. In: Dubois, D. M. (eds): Computing Anticipatory Systems: CASYS'99—Third international Conference, Liege, Belgium, 1999, American Institute of Physics Conference Proceedings 517, 2000, 83-97.
16. Kuznetsov S., Obiedkov S. Comparing Performance of Algorithms for Generating Concept Lattices, 14, Journal of Experimental and Theoretical Artificial Intelligence, Taylor & Francis, pp. 189-216, 2002.
17. Stumme G., Taouil R., Bastide Y., Pasquier N., Lakhal L. Fast Computation of Concept Lattices Using Data Mining Techniques. Proc. 7th Int. Workshop on Knowledge Representation Meets Databases (KRDB 2000), pp. 129-139, 2000.
18. van der Merwe D, Obiedkov S., Kourie D. AddIntent: A New Incremental Algorithm for Constructing Concept Lattices, in: Proceedings of the 2nd International Conference on Formal Concept Analysis (ICFCA 2004). "Concept Lattices, Proceedings", Lecture Notes in Artificial Intelligence, vol. 2961, pp. 372-385, 2004.

(2) PRINCIPAL ASPECTS

The present invention has three "principal" aspects. The first is a system for automatically detecting network services and their dependencies. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein. The one or more processors may have an associated memory with executable instructions encoded thereon such that when executed, the one or more processors perform multiple operations. The associated memory is, for example, a non-transitory computer readable medium.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
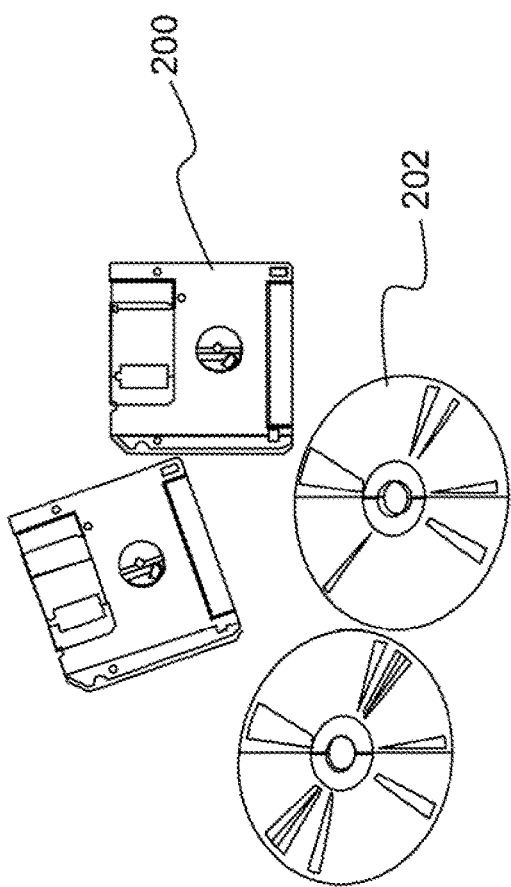
FIG. 2 is an illustration of a computer program product according to some embodiments.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) INTRODUCTION

Figure 3:
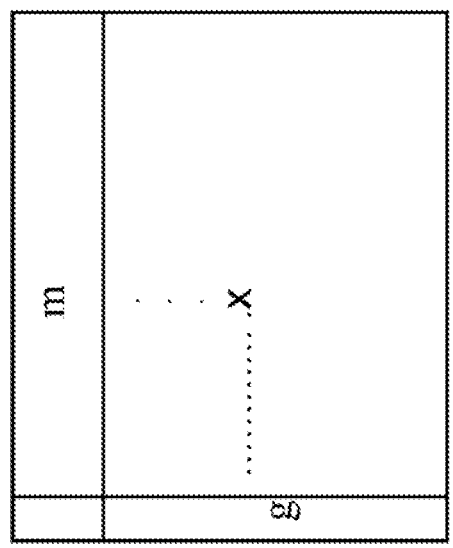
FIG. 3 is an illustration of a first context table according to some embodiments.

Formal concept analysis (FCA) is a principled way of deriving a concept hierarchy or formal ontology from a collection of objects and their properties or attributes. It is a creation of a partial order of the objects based on an ordering relation defined by set inclusion of attributes. Formally, a context $\mathbb{K}=(G, M, I)$ consists of two sets G and M and a relation I, called the incidence relation, between them. The elements of G are called the objects, and the elements of M are called the attributes (see Literature Reference No. 10). If an object $g \in G$ has the attribute $m \in M$, then write gIm or $(g,m) \in I$. A context can be represented by a cross table, which is a rectangular table where the rows are headed by objects and the columns are headed by attributes. An "X" in the intersection of row g and column m means that object g has attribute m, as illustrated in FIG. 3. For a set $A \subseteq G$ of objects, one can define $A'=\{m \in M | gIm \text{ for all } g \in A\}$. In words, for some subset of objects A, A' represents the set of attributes common to all the objects in A. Correspondingly, one can define $B'=\{g \in G | gIm \text{ for all } m \in M\}$. In words, for some subset of attributes B, B' represents the set of objects which have all the attributes in B.

Figure 4:
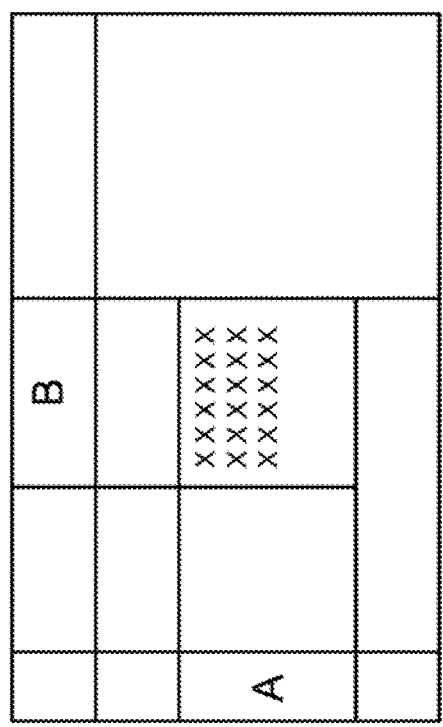
FIG. 4 is an illustration of a concept represented within a context table according to some embodiments.

A formal concept can now be defined. A formal concept of the context (G, M, I) is a pair (A, B) with $A \subseteq G$, $B \subseteq M$, A'=B, and B'=A. A is called the extent, and B is called the intent of the concept (A, B). (G, M, I) denotes the set of all concepts of the context (G, M, I). A concept is represented within a cross table by a maximal contiguous block of X's after arbitrary rearrangement of rows and columns, as show in FIG. 4. Algorithms for determining concept lattices are given in Literature Reference Nos. 10 and 11. Mathematically, the key aspect of concept lattices is that a concept lattice $\mathfrak{B}$ (G, M, I) is a complete lattice in which the infimum and supremum are given by:

$$\bigwedge_{t \in T}(A_t, B_t) = (\bigcap_{t \in T} A_t, (\bigcup_{t \in T} B_t)'') \text{ and}$$

$$\bigvee_{t \in T}(A_t, B_t) = ((\bigcup_{t \in T} A_t)'', \bigcap_{t \in T} B_t).$$

The supremum is called the join and is written $x \vee y$ or sometimes $\vee S$ (the join of the set S). The infimum is called the meet and is written $x \wedge y$ or sometimes $\wedge S$ (the meet of the set S). An extensive description of formal concept analysis is given in Literature Reference No. 10.

(3.1) Example of a Context and Concept Lattice

A concept lattice is a mathematical object represented by (G, M, I) as described above. A concept lattice can be visualized by a Hasse diagram, a directed acyclic graph where the nodes represent concepts and lines represent the inclusion relationship between the nodes. In the case of formal concept analysis, the Hasse diagram has a single top node representing all objects, and a single bottom node representing all attributes. All the nodes in between represent the various concepts comprised of some subset of objects and attributes. A line between two nodes represents the order information. The node above is considered greater than the node below. The node immediately above is said to cover the node(s) below.

Figure 5B:
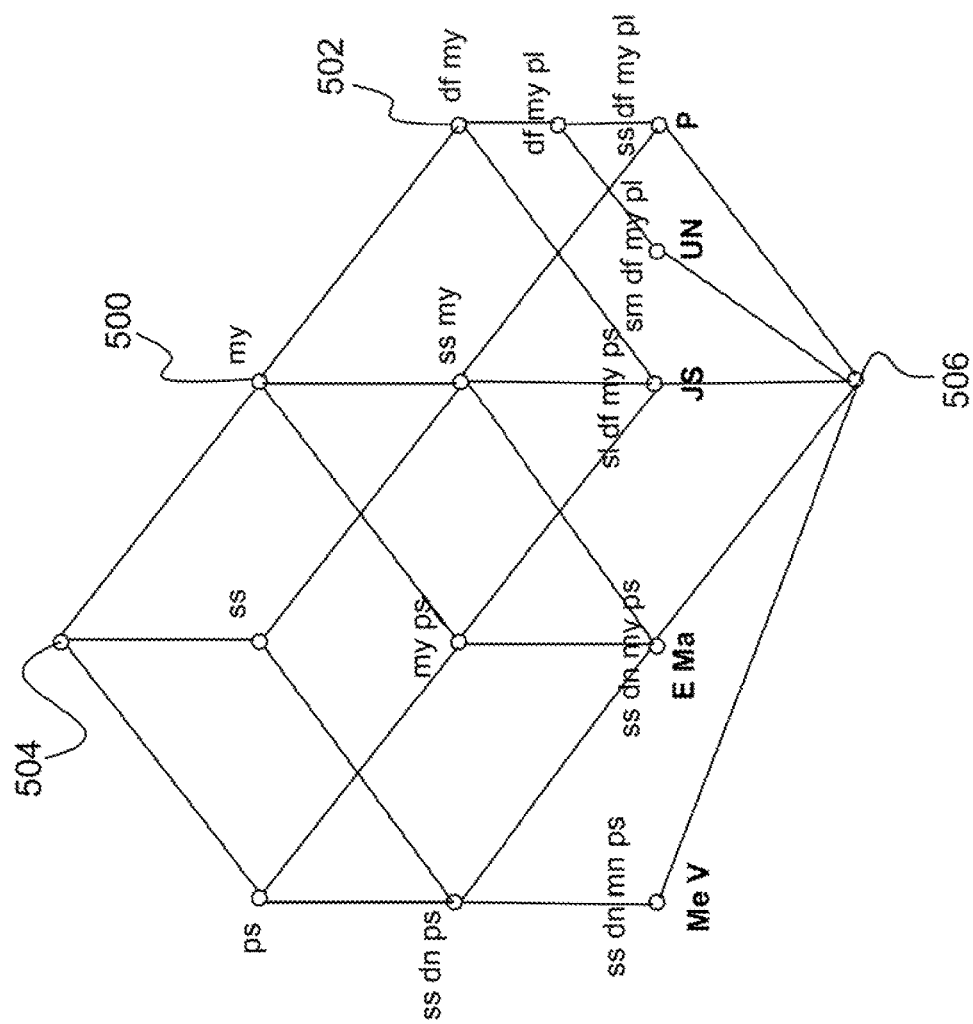
FIG. 5B is an illustration of a lattice resulting from the second context table according to some embodiments.

FIGS. 5A and 5B illustrate a context table and the corresponding Hasse diagram of the concept lattice induced by the formal context, respectively. In this non-limiting example, the objects are nine planets, and the attributes are properties, such as size, distance to the sun, and presence or absence of moons. Each node (represented by circles, such as elements 500 and 502) corresponds to a concept, with its objects consisting of the union of all objects from nodes connecting from above, and attributes consisting of the intersection of all attributes of all the nodes connecting from below. Ultimately, the top most node 504 contains all the objects and only those attributes that all objects share (if any). Correspondingly, the bottom most node 506 contains all the attributes and only those objects that might possess all the attributes.

In typical usage, FCA uses binary attributes. FCA can be extended to use different forms of scaling of attributes using an extension called "Conceptual Scaling" (see Literature Reference Nos. 10, 12, and 15 for a description of Conceptual Scaling). Whereas standard FCA is represented by (G, M, I) as described above, conceptual scaling adds structure to the incident relation I creating many-valued contexts (G, M, W, I). G is the usual set of objects, M is the set of many-valued attributes, W is the set of attribute values, and I is a ternary relation $I \subseteq G \times M \times W$ such that for any $g \in G$, $m \in M$, there is at most one value $w \in W$ satisfying (g, m, w)$\in I$. Therefore, a many-valued attribute m can be understood as a (partial) function and can be written m(g)=w if and only if (g, m, w)$\in I$.

The central granularity-choosing process in conceptual scaling theory is the construction of a formal context $S_m = (W_m, M_m, I_m)$ for each $m \in M$ such that $W_m \supseteq mG := \{m(g) | g \in G\}$. Such formal contexts, called conceptual scales, represent a contextual language about the set of values of m. Usually one chooses $W_m$ as the set of all 'possible' values of m with respect to some purpose. Each attribute n E Mm is called a scale attribute. The set $n' = \{w | w\ I_m\ n\}$ is the extent of the attribute concept of n in the scale $S_m$. Hence, the choice of a scale induces a selection of subsets of $W_m$ describing the granularity (i.e., the scale or level of detail present in a set of data) of the contextual language about the possible values. The set of all intersections of these subsets constitutes just the closure system of all extents of the concept lattice of $S_m$ (see Literature Reference No. 15).

The granularity of the language about the possible values of m induces, in a natural way, a granularity on the set G of objects of the given many-valued context, since each object g is mapped via m onto its value m(g) and m(g) is mapped via the object concept mapping $\gamma_m$ of $S_m$ onto $\gamma_m(m(g))$: $g \to m(g) \to \gamma_m(m(g))$. By combining conceptual scales, multiple granularities of time can be represented. Hence, the set of all object concepts of $S_m$ plays the role of a frame within which each object of G can be embedded.

Temporal representations of processes can be effectively represented by an application of formal concept analysis called "Temporal Concept Analysis" (TCA). One of the key insights of TCA is that the notion of state critically depends on the notion of time 'granularity'. TCA defines a space of 'situations' as a cross between an event state space and a time state space.

A conceptual time system (described in Literature Reference Nos. 13 and 14) is defined as follows: Let G be an arbitrary set and $T := ((G, M, W, I_T), (S_m | m \in M))$ and $C := ((G, E, W, I) (S_e | e \in E))$ are conceptual systems (on the same object set G). Then the pair (T, C) is a conceptual time system on G. T is called the time part, and C is called the event part of (T, C). The elements $g \in G$ are called time granules and represent some period of time in which some measurement or observation m(g) is valid.

The derived context of T is denoted by $\mathbb{K}\,T$, the derived context of C is denoted by $\mathbb{K}\,C$, and the apposition of $\mathbb{K}\,T$ and $\mathbb{K}\,C$ is denoted by $\mathbb{K}\,TC := \mathbb{K}\,T | \mathbb{K}\,C$ (see Literature Reference Nos. 10 and 12). It is called the derived context of the conceptual time system (T, C). The object concepts of $\mathbb{K}\,TC$ are called situations, the object concepts of $\mathbb{K}\,C$ are called states, and the object concepts of $\mathbb{K}\,T$ are called time states. The sets of situations, states, and time states are called the situation space, the state space, and the time state space of (T, C), respectively. The object concept mappings of $\mathbb{K}\,TC$, $\mathbb{K}\,T$, and $\mathbb{K}\,C$ are denoted by $\gamma$, $\gamma T$, and $\gamma C$, respectively.

The table in FIG. 6 is an example of headers as objects and the header fields and their values, which are standard in networking literature. The tables in FIG. 7 are examples of object-attribute context tables resulting from the header data in the table in FIG. 6. A header is supplemental data placed at the beginning of a block of data being stored or transmitted containing instructions about the block of data. Instructions may include length of packet, packet number, protocol (i.e., what type of data is being transmitted), destination address, and originating address.

(4) SPECIFIC DETAILS OF THE INVENTION

Figure 8:
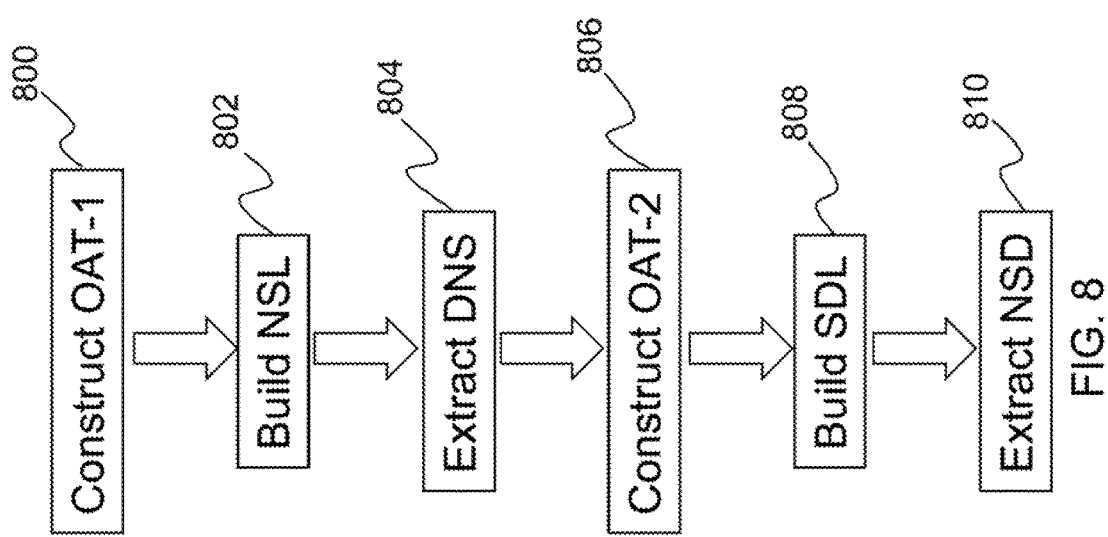
FIG. 8 is a flow diagram of the operations of the system according to some embodiments.

The system according to some embodiments identifies network services from packet headers and their dependencies as illustrated in FIG. 8. Additionally, the system can be used to detect applications running on servers, or nodes in such a network. In a first operation 800, an Object-Attribute Table (OAT-1) (or context table) is constructed. The OAT-1 contains each packet header as an object and the values of header fields as attributes (see the table in FIG. 7, for example).

In a second operation 802, the OAT-1 table is used to construct a concept lattice, referred to as the Network Services Lattice (NSL). For further details regarding constructing a lattice, see Literature Reference Nos. 16-18. The NSL identifies the relationship between headers and the values in their fields in the network. By analyzing the NSL lattice from the second operation 802, one can identify/extract the dominating network services (DNS), consisting of tuples (DST_IP, DST_PORT, PROTOCOL) in a third operation 804, where DST_IP represents a destination IP (Internet Protocol) address, DST_PORT represents a destination port number, and PROOCOL represents the OSI layer 4 protocol, such as the transmission control protocol (TCP) or user datagram protocol (UDP). This is done by classifying the nodes constructed in the lattice in conjunction with one of the following approaches:

The nodes with well-known destination ports (DST_PORT)
The nodes with well-known DST-IP addresses (DST_IP)
The nodes that contain a predetermined set of header values
The nodes that exceed a certain threshold of object The DNS that are identified in the third operation 804 are then used to select a subset of headers that correspond to those network services (but here the IP address that was DST_IP should be SRC_IP (source IP address)). In this case, one would be looking at those services as sources of traffic and the attributes have to also contain a temporal relationship (e.g., within how many milliseconds (if that timing granularity is available) did an object occur from another). Another Object-Attribute Table (referred to as OAT-2) is constructed using the above data in a fourth operation 806.

The OAT-2 table from the fourth operation 806 is used to construct a lattice (referred to as the Service Dependency Lattice (SDL)) in a fifth operation 808. The constructed SDL from the fifth operation 808 will capture the relationships between different network services and their temporal dependencies. Using the nodes of the SDL (from the fifth operation 808) one can identify/extract network service dependencies and implications (NSD) in a sixth operation 810, which can be leveraged in network services analysis.

Automated approaches to infer (reverse engineer) network services in operation are an important addition to an administrator's arsenal. Such approaches can also be part of an Intrusion Detection System (IDS). Anywhere network dependency monitoring is being used in a situation in which the network topology and monitoring points are well known, various embodiments of the system could help mitigate blind spots and false negatives that tend to be prevalent with passive methods. A security monitoring infrastructure system can benefit from such an approach to aid administrators in identifying important servers and schedule maintenance around them.

For example, a non-limiting commercial application of this technology could be generating firewall rules and/or traffic filtering rules to protect enterprise or other computer networks. In this example application, the algorithms described in the present disclosure would be implemented in software and one would collect network traffic from the network when it is first configured and installed (i.e., using open source, commercial tools, or other tools/functions in commercial networking equipment and switches/routers). Once the network traffic is recorded, the tools analyze it to generate the tables describing which network services correspond to which packet headers, and which network services depend on each other. These tables can then be converted into firewall or traffic filtering rules. For example, the table that maps network services to packet header information can be used to generate rules to only allow the packet for specific services, by allowing any packet that has the information matching the columns of a table corresponding to the rows of a specific service. Columns and rows may be reversed depending on how one constructs the table. The table showing dependencies between different network services can be used to help administrators understand how interruption in a network service would affect other services. For instance, if a network service depends on another service, and the first service corresponds to a row in the table and the second service to a specific column, then if the intersection of that row and column is non-empty, then a disruption in the second service would affect the first service.

An additional non-limiting example includes flagging and performing intrusion detection and detecting malfunctions to protect enterprise or other computer networks. Similar to that described above, the generated tables capture the behavior of the network (i.e., which services generate which packets and what information is expected to be in the packet headers). To use such tables for intrusion detection or for flagging malfunctions (or anomalies in general) in a network, one would periodically (and passively) collect traffic from the operation of the network (as explained in the first example above). Then, by implementing the present invention in software and having that software analyze the collected traffic and generate the tables, one can compare them to the original tables. If differences are found then one could flag them to a network or systems administrator or operator.

What is claimed is:

1. A system for automatically detecting network services and their dependencies, the system comprising:
   one or more processors having associated memory with executable instructions encoded thereon such that when executed, the one or more processors perform operations of:
      generating a first context table having a plurality of rows and columns representing objects and attributes, respectively, wherein the objects are packet headers and the attributes are a set of values of header fields;
      generating a first concept lattice having a plurality of nodes using the first context table, wherein the first concept lattice is used to identify relationships between the packet headers and the set of values of header fields;
      identifying a set of network services and a set of corresponding packet headers using the first concept lattice, wherein the set of network services comprises a tuple of network services, and wherein the set of network services is identified by classifying the plurality of nodes in the first concept lattice;
      generating a second context table using the set of corresponding packet headers and a set of attributes related to the set of corresponding packet headers;
      generating a second concept lattice having a plurality of nodes using the second context table, wherein the second concept lattice indicates relationships between network services and their temporal network service dependencies;
      identifying a plurality of network service dependencies using the plurality of nodes in the second concept lattice; and
      using at least one of the first context table and the second context table to monitor the plurality of network service dependencies.

2. The system as set forth in claim 1, wherein the set of attributes related to the set of corresponding packet headers comprises a temporal relationship.

3. A computer-implemented method for automatically detecting network services and their dependencies, the computer-implemented method using one or more processors to perform operations of:
   generating, with the one or more processors, a first context table having a plurality of rows and columns representing objects and attributes, respectively, wherein the objects are packet headers and the attributes are a set of values of header fields;
   generating, with the one or more processors, a first concept lattice having a plurality of nodes using the first context table, wherein the first concept lattice is used to identify relationships between the packet headers and the set of values of header fields;
   identifying, with the one or more processors, a set of network services and a set of corresponding packet headers using the first concept lattice, wherein the set of network services comprises a tuple of network services, and wherein the set of network services is identified by classifying the plurality of nodes in the first concept lattice;
   generating, with the one or more processors, a second context table using the set of corresponding packet headers and a set of attributes related to the set of corresponding packet headers;
   generating, with the one or more processors, a second concept lattice having a plurality of nodes using the second context table, wherein the second concept lattice indicates relationships between network services and their temporal network service dependencies;
   identifying, with the one or more processors, a plurality of network service dependencies using the plurality of nodes in the second concept lattice; and
   using at least one of the first context table and the second context table to monitor the plurality of network service dependencies.

4. The method as set forth in claim 3, wherein the set of attributes related to the set of corresponding packet headers comprises a temporal relationship.

5. A computer program product for automatically detecting network services and their dependencies, the computer program product comprising:
   computer-readable instructions stored on a non-transitory computer-readable medium that are executable by a computer having one or more processors for causing the one or more processors to perform operations of:
      generating a first context table having a plurality of rows and columns representing objects and attributes, respectively, wherein the objects are packet headers and the attributes are a set of values of header fields;
      generating a first concept lattice having a plurality of nodes using the first context table, wherein the first concept lattice is used to identify relationships between the packet headers and the set of values of header fields;
      identifying a set of network services and a set of corresponding packet headers using the first concept lattice, wherein the second concept lattice indicates relationships between network services and their temporal network service dependencies;

generating a second context table using the set of corresponding packet headers and a set of attributes related to the set of corresponding packet headers;

generating a second concept lattice having a plurality of nodes using the second context table, wherein the second concept lattice indicates relationships between network services and their temporal network service dependencies;

identifying a plurality of network service dependencies using the plurality of nodes in the second concept lattice; and using at least one of the first context table and the second context table to monitor the plurality of network service dependencies.

6. The computer program product as set forth in claim 5, wherein the set of attributes related to the set of corresponding packet headers comprises a temporal relationship.

* * * * *